United States Patent
Cai

(10) Patent No.: US 11,942,976 B2
(45) Date of Patent: Mar. 26, 2024

(54) COMMUNICATION ANTI-INTERFERENCE DETECTION METHOD AND DEVICE

(71) Applicant: ZTE Corporation, Shenzhen (CN)

(72) Inventor: Lingyun Cai, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 53 days.

(21) Appl. No.: 17/615,884

(22) PCT Filed: Mar. 25, 2020

(86) PCT No.: PCT/CN2020/081197
§ 371 (c)(1),
(2) Date: Dec. 2, 2021

(87) PCT Pub. No.: WO2021/004092
PCT Pub. Date: Jan. 14, 2021

(65) Prior Publication Data
US 2022/0311463 A1  Sep. 29, 2022

(30) Foreign Application Priority Data
Jul. 5, 2019 (CN) .......................... 201910608780.0

(51) Int. Cl.
*H04B 1/10* (2006.01)
*H04B 1/16* (2006.01)

(52) U.S. Cl.
CPC .................................. *H04B 1/1027* (2013.01)

(58) Field of Classification Search
CPC ...... H04B 1/10; H04B 1/1027; H04B 1/1036; H04B 1/16; H04B 2001/1045; H04B 1/12; H04B 1/123
See application file for complete search history.

(56) References Cited

U.S. PATENT DOCUMENTS

| 8,103,236 B2 * | 1/2012 | Feng ..................... H04B 1/1036 455/313 |
| 9,042,497 B2 * | 5/2015 | Abdelmonem ...... H04B 1/1036 375/232 |

(Continued)

FOREIGN PATENT DOCUMENTS

| CN | 101414847 A | 4/2009 |
| CN | 102684737 A | 9/2012 |

(Continued)

OTHER PUBLICATIONS

European Search Report for corresponding application EP 20 83 7092; Report dated Jul. 25, 2022.

(Continued)

*Primary Examiner* — Quochien B Vuong
(74) *Attorney, Agent, or Firm* — CANTOR COLBURN LLP

(57) ABSTRACT

Provided are a communication anti-interference detection method and device. The method includes: demodulating an input radio-frequency signal to acquire a demodulated signal; convolving a first signal and a second signal to acquire a detection signal, so as to detect whether there is an interfering signal in the input radio-frequency signal, wherein the first signal is a signal acquired by performing inverse Fourier transform on the demodulated signal, and the second signal is a signal acquired by performing phase inversion on a preset baseband signal; and performing anti-interference processing on an interfered signal, wherein a signal anti-interference method further includes: after deconvolving the interfering detection signal, performing subtraction or inverse superposition on the detection signal and the first signal, and filtering out the interfering signal to acquire a third signal; and modulating the third signal to acquire an output radio-frequency signal.

20 Claims, 7 Drawing Sheets

(56) References Cited

U.S. PATENT DOCUMENTS

| | | | |
|---|---|---|---|
| 9,748,988 B2* | 8/2017 | Wang | H04B 1/1036 |
| 10,128,898 B2 | 11/2018 | Macmullan | |
| 11,101,843 B1* | 8/2021 | Wild | H04B 1/1036 |
| 2004/0062317 A1 | 4/2004 | Uesugi | |
| 2009/0061805 A1* | 3/2009 | Kim | H04B 1/123 |
| | | | 455/296 |
| 2014/0270015 A1 | 9/2014 | Kravtsov | |

FOREIGN PATENT DOCUMENTS

| | | |
|---|---|---|
| CN | 107171742 A | 9/2017 |
| CN | 108683466 A | 10/2018 |
| WO | 2018155252 A1 | 8/2018 |

OTHER PUBLICATIONS

International Search Report for corresponding application PCT/CN2020/081197 filed Mar. 25, 2020; dated Jun. 29, 2020.

* cited by examiner

COMMUNICATION ANTI-INTERFERENCE DETECTION METHOD AND DEVICE

CROSS-REFERENCE TO RELATED APPLICATION

The present disclosure is a national stage filing of PCT Application No. PCT/CN2020/081197 filed on Mar. 25, 2020, which claims priority to Chinese Patent Application No. 201910608780.0, filed with the China National Intellectual Property Administration on Jul. 5, 2019 and entitled "Communication Anti-Interference Detection Method and Device", which is hereby incorporated by reference in its entirety.

TECHNICAL FIELD

The present disclosure relates to the fields of $5^{th}$ Generation (5G), communications and signal detection, and in particular, to a communication anti-interference detection method and device.

BACKGROUND

With the rapid development and maturity of 4G/4G+ (the $4^{th}$ Generation communication system), there are problems of shortage of frequency resources, huge consumption of energy and network optimization, making it difficult for the $4^{th}$ Generation communication system to meet the requirements of future mobile communications, and countries and institutions have shifted the focus of research and development to future 5G communications (the $5^{th}$ Generation communication system). In a 5G system, the peak rate, the user experience rate, the spectrum efficiency and some new indexes will all be greatly improved. Technologies, such as ultra-dense networking, large-scale MIMO, non-orthogonal transmission, high-band communication, C-RAN, SDN/NFV, content delivery network (CDN), etc. are all considered to be potential key technologies of 5G. This undoubtedly put forwards higher requirements on the intelligent terminal device. Among terminals supporting the 5G communication system, a currently popular 4G LTE communication system will be reserved, that is to say, in future terminals, 4G LTE will coexist with 5G, and even in the case where a $6^{th}$ Generation (6G) communication system appears later, various potential interferences will be generated continuously. Interference becomes an important factor that limits and influences the capacity and quality of the mobile communication system. The radio-frequency interference problem of the mobile communication network is ubiquitous and needs to be solved. Therefore, there is a need to detect an interfering signal and filter out the interfering signal by using an effective method.

For the described urgent need for an anti-interference module to filter out the interfering signal and solve the problem of interference, the existing 5G high-out-band suppression filter is expensive, and no solution capable of performing detection and filtering out the interfering signal has been proposed in the related art.

SUMMARY

The embodiments of the present disclosure provide a communication anti-interference detection method and device, which can solve the problem of continuous signal interferences caused by the coexistence of two systems in the related art. According to some embodiments of the present disclosure, a communication anti-interference detection method is provided. FIG. 1 is a block diagram of a main flow according to some embodiments of the present disclosure. As shown in FIG. 1, the method includes the following operations S102 and S103.

In S102, an input radio-frequency signal is demodulated to acquire a demodulated signal.

In S103, a first signal and a second signal are convolved to acquire a detection signal, so as to detect whether there is an interfering signal in the input radio-frequency signal, wherein the first signal is a signal acquired by performing inverse Fourier transform on the demodulated signal, and the second signal is a signal acquired by performing phase inversion on a preset baseband signal.

According to some embodiments of the present disclosure, provided is a signal anti-interference method, which includes operations of the foregoing signal interference detection method. The signal anti-interference method further includes: in cases where there is the interfering signal in the radio-frequency signal, processing the interfering detection signal and the first signal to acquire a third signal; and modulating the third signal to acquire an output radio-frequency signal.

According to some embodiments of the present disclosure, provided is a communication anti-interference detection device, including: a demodulation module, an interference detection module, an anti-interference module, and a radio-frequency circuit processing module. After being demodulated by the demodulation module, an input radio-frequency signal enters the interference detection module to acquire a detection signal; and in cases where the detection signal is interfering, the input radio-frequency signal enters the anti-interference module to acquire a third signal, and the third signal is modulated to acquire an output radio-frequency signal, and is processed by the radio-frequency circuit processing module.

A storage medium, wherein the storage medium is configured to store a computer program, the computer program is configured to execute the foregoing method during running.

An electronic device, including a memory and a processor, wherein the memory is configured to store a computer program, and the processor is configured to run the computer program to execute the foregoing method.

BRIEF DESCRIPTION OF THE DRAWINGS

The accompanying drawings described herein are used to provide a deeper understanding of the present disclosure, and constitute a part of the present application. The exemplary embodiments of the present disclosure and the description thereof are used to explain the present disclosure. The drawings and the exemplary embodiment do not constitute limitations to the present disclosure. In the drawings.

DETAILED DESCRIPTION

Some embodiments of the present disclosure provide a communication anti-interference detection method, in which a radio-frequency signal is demodulated and then subjected to interference detection, after the demodulated signal is subjected to inverse Fourier transform and convolution, the signal enters a logic control switch, an interfering signal is filtered out by an anti-interference circuit, and a useful signal is modulated to a radio-frequency signal. If there is no interfering signal, the radio-frequency signal is processed by the radio-frequency circuit. The embodiments of the present disclosure provide a novel wireless communication anti-interference detection module. When two adjacent frequency bands, especially current 5G and 4G or future 5G and 6G, work at the same time, an intermediate protection bandwidth between the two adjacent frequency bands is narrow and an interfering signal is strong. The embodiments of the present disclosure detect and filter out an interfering signal, so that a good radio-frequency performance can be achieved, thereby alleviating the disadvantages of the related art. Furthermore, the solution of the embodiments of the present disclosure has the advantages of low cost, strong operability, easiness in implementation, good effect and high performance-price ratio.

Figure 1:
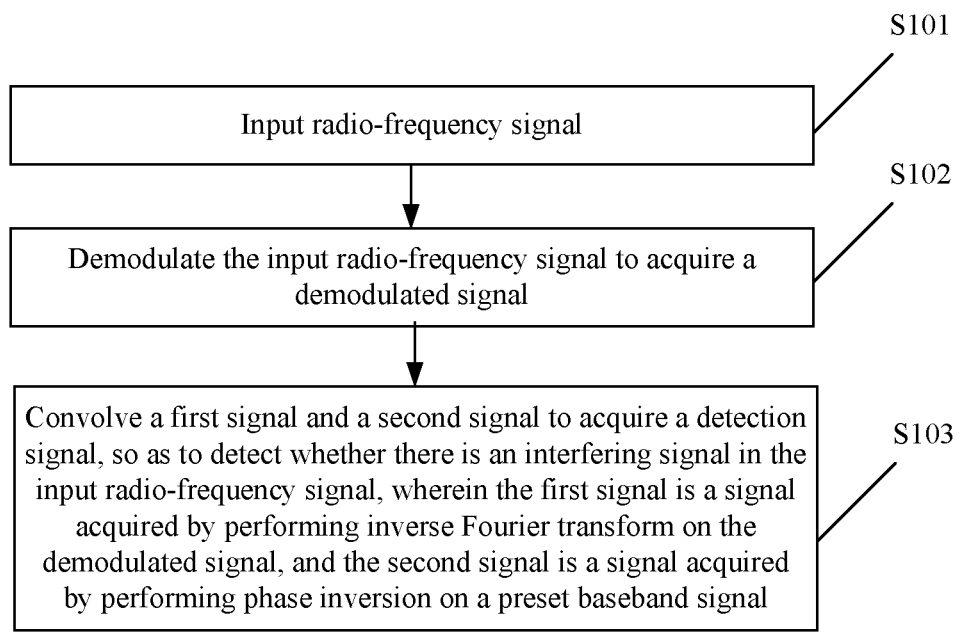
FIG. 1 is a block diagram of a main flow according to some embodiments of the present disclosure.
Figure 2:
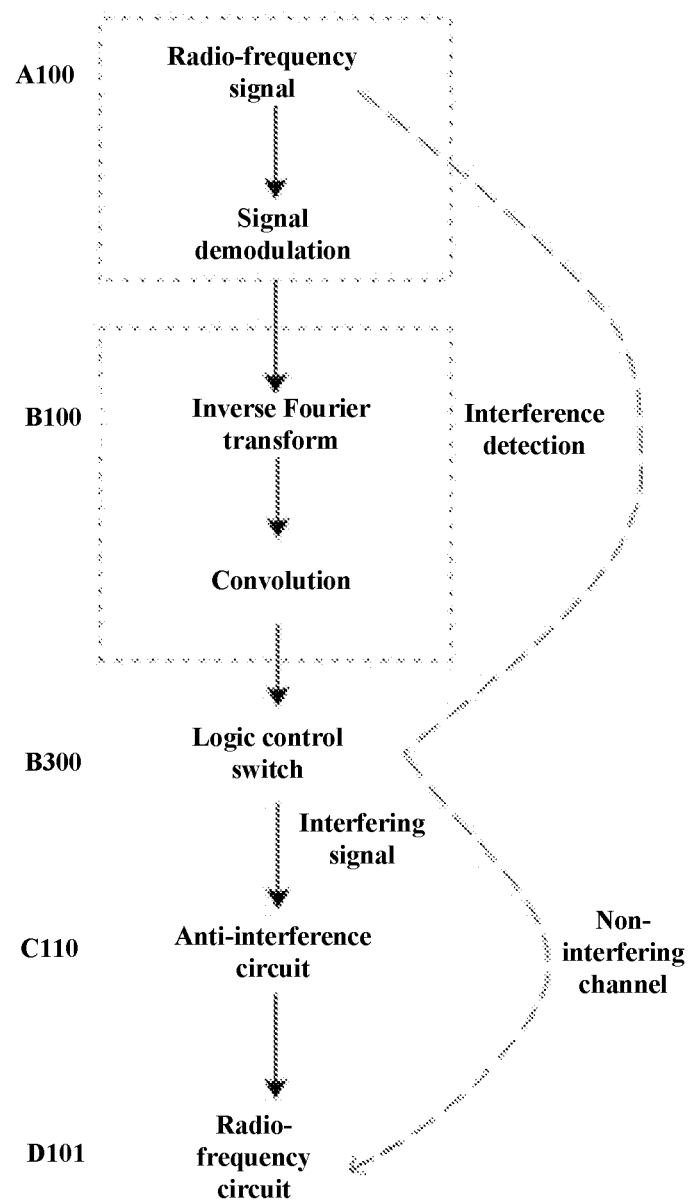
FIG. 2 is a schematic diagram of an anti-interference detection method according to some embodiments of the present disclosure.

According to some embodiments of the present disclosure, a communication anti-interference detection method is provided. FIG. 2 is a schematic diagram of an anti-interference detection method according to some embodiments of the present disclosure. As shown in FIG. 2, the method includes the following operations.

In A100, an input radio-frequency signal is demodulated to acquire a demodulated signal.

In B100, a first signal and a second signal are convolved to acquire a detection signal, so as to detect whether there is an interfering signal in the input radio-frequency signal, wherein the first signal is a signal acquired by performing inverse Fourier transform on the demodulated signal, and the second signal is a signal acquired by performing phase inversion on a preset baseband signal.

In some embodiments, the input radio-frequency signal includes a first input radio-frequency signal and/or a second input radio-frequency signal, and the first input radio-frequency signal and the second input radio-frequency signal are based on different systems.

In some embodiments, the operation that the input radio-frequency signal is demodulated includes: attenuation processing is performed on the input radio-frequency signal, and then the attenuated radio-frequency signal is demodulated to acquire the demodulated signal.

In some embodiments, the operation of detecting whether there is an interfering signal in the input radio-frequency signal includes: the inverse Fourier transform is performed on the demodulated signal to acquire the first signal, wherein a manner for performing the inverse Fourier transform on the demodulated signal includes performing the inverse Fourier transform on the demodulated signal to generate a superposition of sine waves having different frequencies; the phase inversion is performed on the preset baseband signal to acquire the second signal; the first signal and the second signal are convolved to remove a useful sine wave signal, so as to acquire the detection signal; and whether the detection signal is interfering is determined.

In C110, in cases where the detection signal is interfering, anti-interference processing is performed on the interfering detection signal.

In D101, in cases where the detection signal is not interfering, the input radio-frequency signal enters, via a non-interfering channel, the radio-frequency circuit for processing.

Some embodiments of the present disclosure provide a signal anti-interference method, which includes the operations of the foregoing signal interference detection method. The signal anti-interference method further includes: in cases where there is the interfering signal in the radio-frequency signal, the interfering detection signal and the first signal are processed to acquire a third signal; and the third signal is modulated to acquire an output radio-frequency signal.

In some embodiments, the operation that the third signal is acquired further includes: after the interfering detection signal is deconvolved, subtraction or inverse superposition is performed on the interfering detection signal and the first signal, and the interfering signal is filtered out to acquire the third signal.

Figure 3:
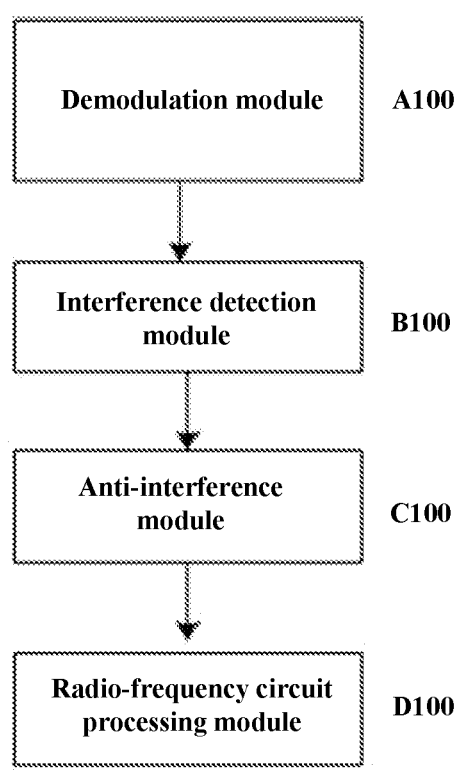
FIG. 3 is a schematic structural diagram of an anti-interference detection device according to some embodiments of the present disclosure.

According to some embodiments of the present disclosure, a communication anti-interference detection device is provided. FIG. 3 is a schematic structural diagram of an anti-interference detection device according to some embodiments of the present disclosure. As shown in FIG. 3, the device includes: a demodulation module A100, an interference detection module B100, an anti-interference module C100, and a radio-frequency circuit processing module D100.

After being demodulated by the demodulation module, an input radio-frequency signal enters the interference detection module to acquire a detection signal; and in cases where the detection signal is interfering, the input radio-frequency signal enters the anti-interference module to acquire a third signal, and the third signal is modulated to acquire an output radio-frequency signal, and is processed by the radio-frequency circuit processing module.

Figure 4:
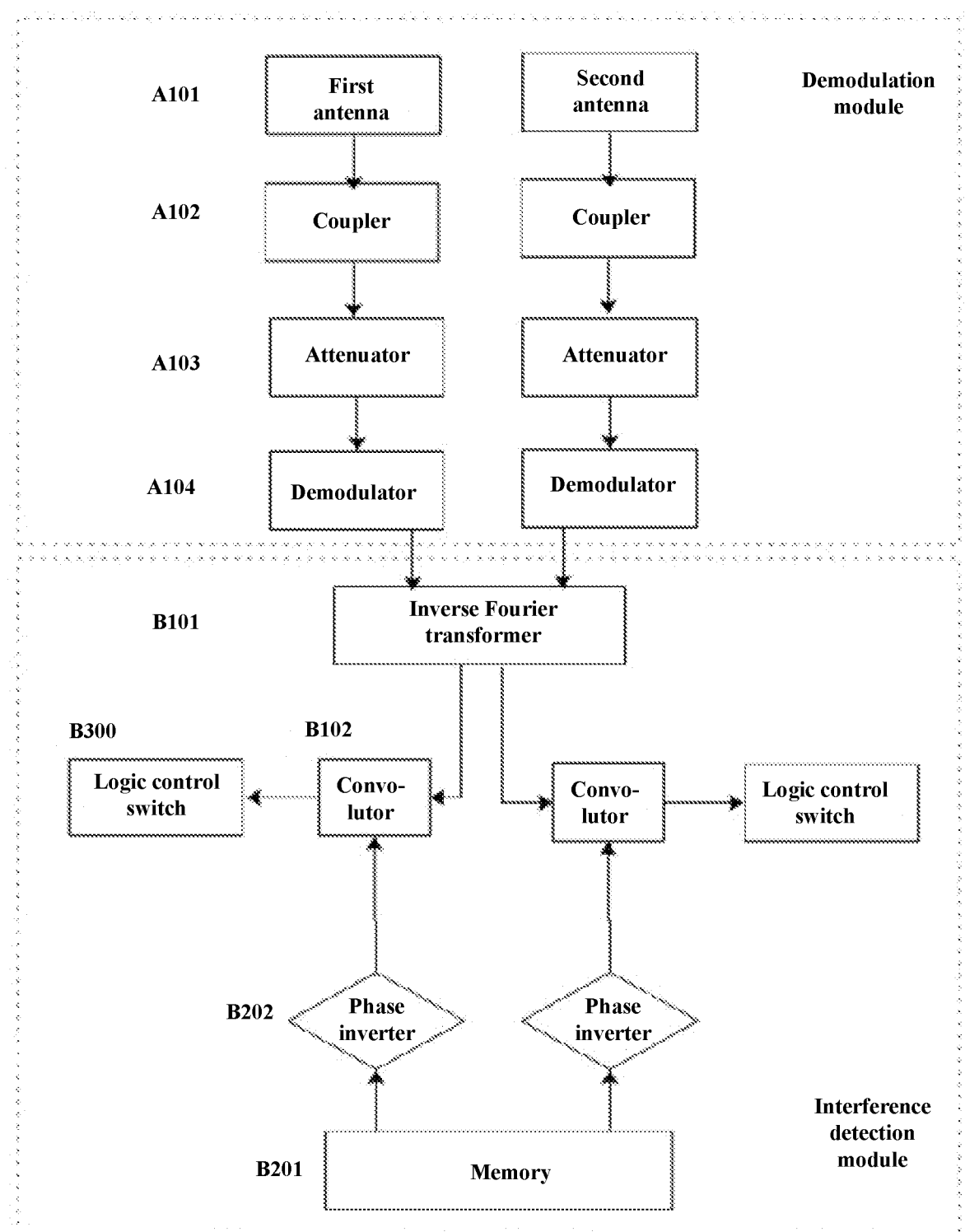
FIG. 4 is a schematic structural diagram of a demodulation module and an interference detection module according to some embodiments of the present disclosure.

In some embodiments, as shown in FIG. 4 which is a schematic structural diagram of a demodulation module and an interference detection module according to some embodiments of the present disclosure, the demodulation module includes: a first antenna A101 and/or a second antenna A101, an attenuator A103, and a demodulator A104. The first antenna and/or the second antenna are/is configured to receive the input radio-frequency signal. The attenuator is configured to perform attenuation processing on the input radio-frequency signal. The demodulator is configured to demodulate the signal. The attenuator and demodulator through which the input radio-frequency signal received by the first antenna passes, and the attenuator and demodulator through which the input radio-frequency signal received by the second antenna passes are the same set of attenuator and demodulator, or are two or more sets of attenuators and demodulators.

Any antenna, attenuator, and demodulator having the functions and capable of meeting the requirements are applicable to the embodiments of the present disclosure, which is not specifically limited in the present disclosure.

In some embodiments, as shown in FIG. 4 which is a schematic structural diagram of a demodulation module and an interference detection module according to some embodiments of the present disclosure, the interference detection module includes an interference detection circuit which includes an inverse Fourier transformer B101, a memory B201, a phase inverter B202 and a convolutor B102. The demodulated signal is subjected to inverse Fourier transform to generate a superposition of sine waves having different frequencies, so as to acquire a first signal. The phase of a preset baseband signal in the memory is inverted by the phase inverter to acquire a second signal. The first signal and the second signal are convolved by the convolutor to remove a useful sine wave signal, so as to acquire a convolved detection signal. It is determined whether the detection signal is interfering. In cases where the detection signal is interfering, the interfering detection signal enters an anti-interference circuit via a logic control switch B300 for anti-interference processing. In cases where the detection signal is not interfering, the input radio-frequency signal enters, via a non-interfering channel, the radio-frequency circuit processing module for processing. The same set of inverse Fourier transformer, memory, phase inverter, convolutor and logical control switch is shared by signals of different systems, or two or more sets of inverse Fourier transformers, memories, phase inverters, convolutors and logical control switches are respectively used for signals of different systems.

Any module having the function and capable of performing the required inverse Fourier transform-like function is suitable for the embodiments of the present disclosure. Any memory, ant inverter and any convolutor having the functions and capable of meeting the requirements are suitable for the embodiment of the present disclosure, which is not specifically limited in the present disclosure.

Figure 5:
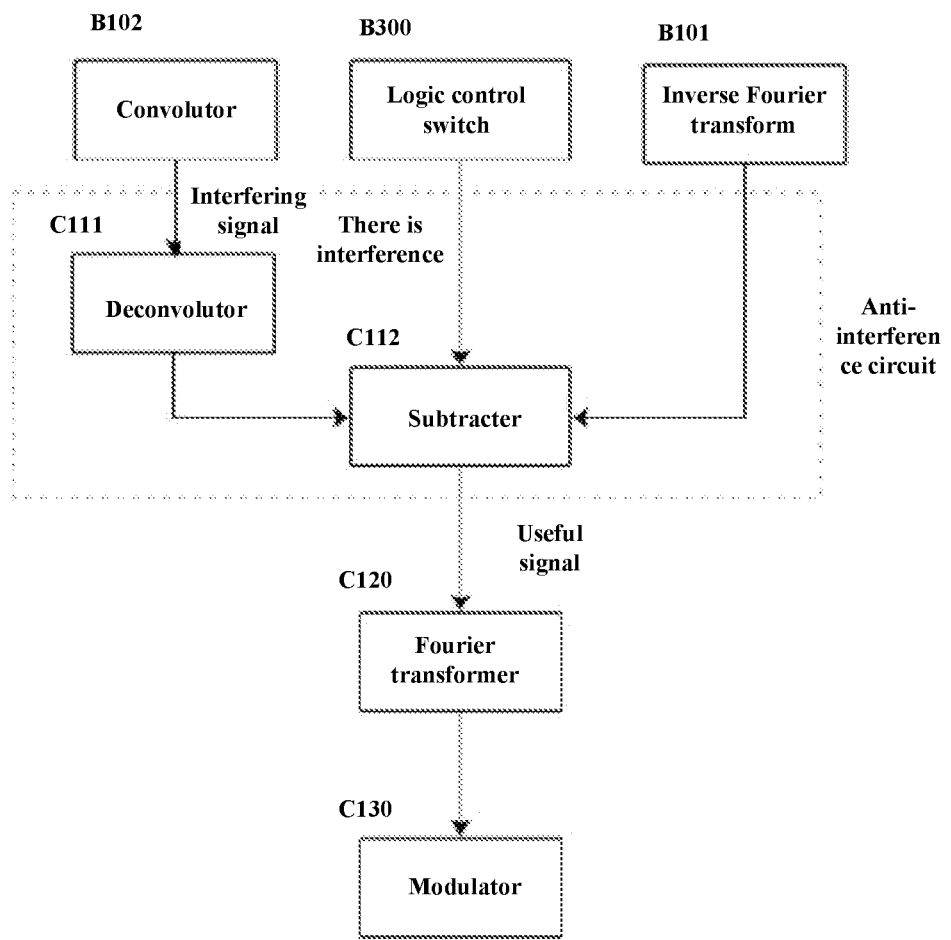
FIG. 5 is a schematic structural diagram of an anti-interference module according to some embodiments of the present disclosure.

In some embodiments, as shown in FIG. 5 which is a schematic structural diagram of an anti-interference module according to some embodiments of the present disclosure, the anti-interference module includes: an anti-interference circuit, a Fourier transformer and a demodulator. The anti-interference circuit includes a deconvolutor C111 and a subtracter C112. The deconvolutor is configured to process the interfering detection signal. After passing through the deconvolutor, the interfering detection signal is subtracted from or reversely superimposed with the signal subjected to Fourier transform, and an interfering signal is filtered out to acquire the third signal. The third signal is processed by Fourier transformer C120 and then modulated by a modulator C130 to acquire the output radio-frequency signal. The same set of convolutor, subtracter and Fourier transformer is shared by signals of different systems, or two or more sets of convolutors, subtracters and Fourier transformers are respectively used for signals of different systems.

Any module having the function and capable of performing the required Fourier transform-like function is suitable for the embodiments of the present disclosure. Any deconvolutor, any subtracter, and any demodulator having the functions and capable of meeting the requirements are suitable for the embodiments of the present disclosure, which is not specifically limited in the present disclosure.

Figure 6:
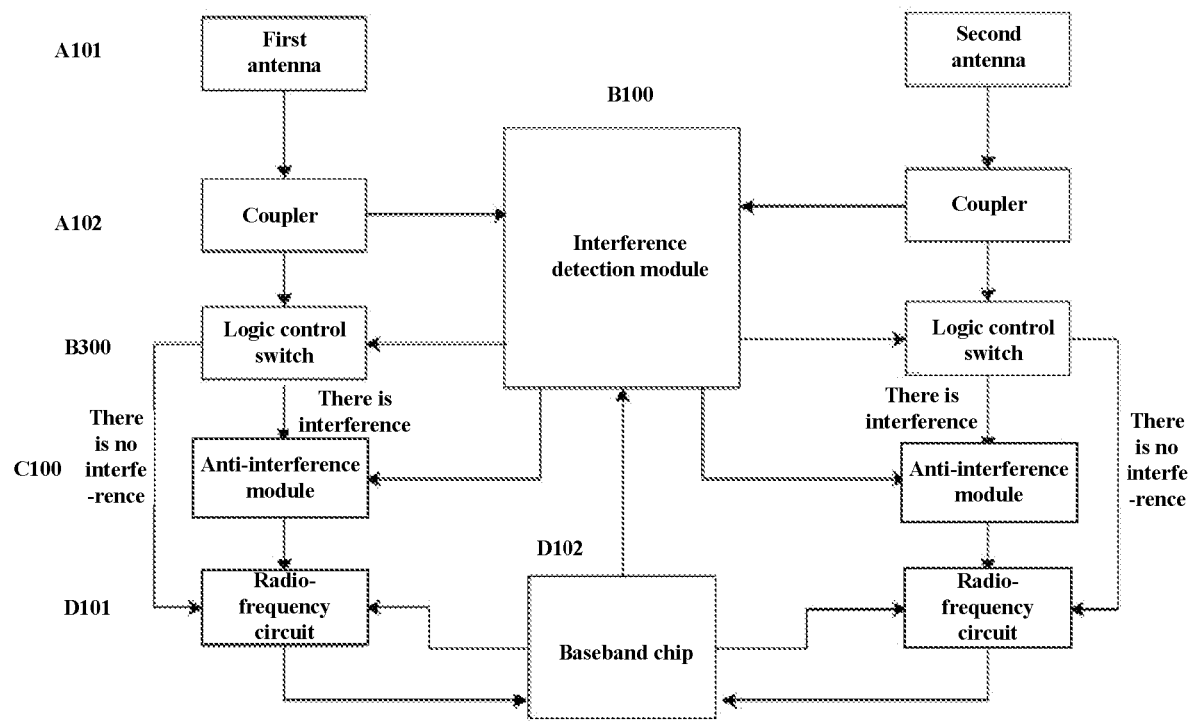
FIG. 6 is a schematic diagram of an overall flow framework of wireless communication anti-interference detection according to some embodiments of the present disclosure.

According to some embodiments of the present disclosure, FIG. 6 is a schematic diagram of an overall flow framework of wireless communication anti-interference detection according to some embodiments of the present disclosure. As shown in FIG. 6, the radio-frequency circuit processing module includes: a radio-frequency circuit D101 and a radio-frequency chip D102. The output radio-frequency signal is processed by the radio-frequency circuit. In cases where the detection signal is not interfering, the input radio-frequency signal enters, via a non-interfering channel, the radio-frequency circuit for processing.

Any radio-frequency circuit and any radio-frequency chip having the functions and capable of meeting the requirements are applicable to the embodiments of the present disclosure, which is not specifically limited in the present disclosure.

A storage medium is also provided, wherein the storage medium is configured to store a computer program, and the computer program is configured to execute the foregoing method during running. Any storage medium having the functions and capable of meeting the requirements is suitable for the embodiments of the present disclosure, and the present disclosure is not specifically limited.

An electronic device is also provided, including a memory and a processor, wherein the memory is configured to store a computer program, and the processor is configured to run the computer program to execute the foregoing method. Any memory and any processor having the functions and capable of meeting the requirements are suitable for the embodiments of the present disclosure, and the present disclosure is not specifically limited.

In addition, some embodiments of the present disclosure provide a computer program product.

The computer program product includes a computer program stored in a non-transitory computer-readable storage medium. The computer program product includes a program instruction, and when the program instruction is executed by a computer, the computer is caused to execute the method of the foregoing method embodiments.

The present disclosure will be described below in details with reference to the accompanying drawings. It should be understood that the exemplary embodiments described herein are only intended to explain the present disclosure, but not to limit the present disclosure. The embodiments and the features of embodiments of the present disclosure can be combined in case that no conflict is caused.

The embodiments provide a communication anti-interference detection method. FIG. 6 is a schematic block diagram of an overall flow of wireless communication anti-interference detection according to some embodiments of the present disclosure. As shown in FIG. 6, the method includes the following operations.

A radio-frequency signal received by a first antenna A101 and/or a second antenna A101 passes through a coupler A102, and is processed by an anti-interference detection module B100. The determination result on whether the value of the signal is zero or whether the signal is interfering controls a logic control switch B300, such as a switch SP2T. If the value is zero or the signal is not interfering, the coupler A102 is controlled to send the received radio-frequency signal directly to a radio-frequency circuit D101 for processing. If the value is not zero or the signal is interfering, an interfering signal is filtered out by an anti-interference module C100, and finally a useful signal is modulated to the radio-frequency signal and processed by the radio-frequency circuit D101.

Figure 7:
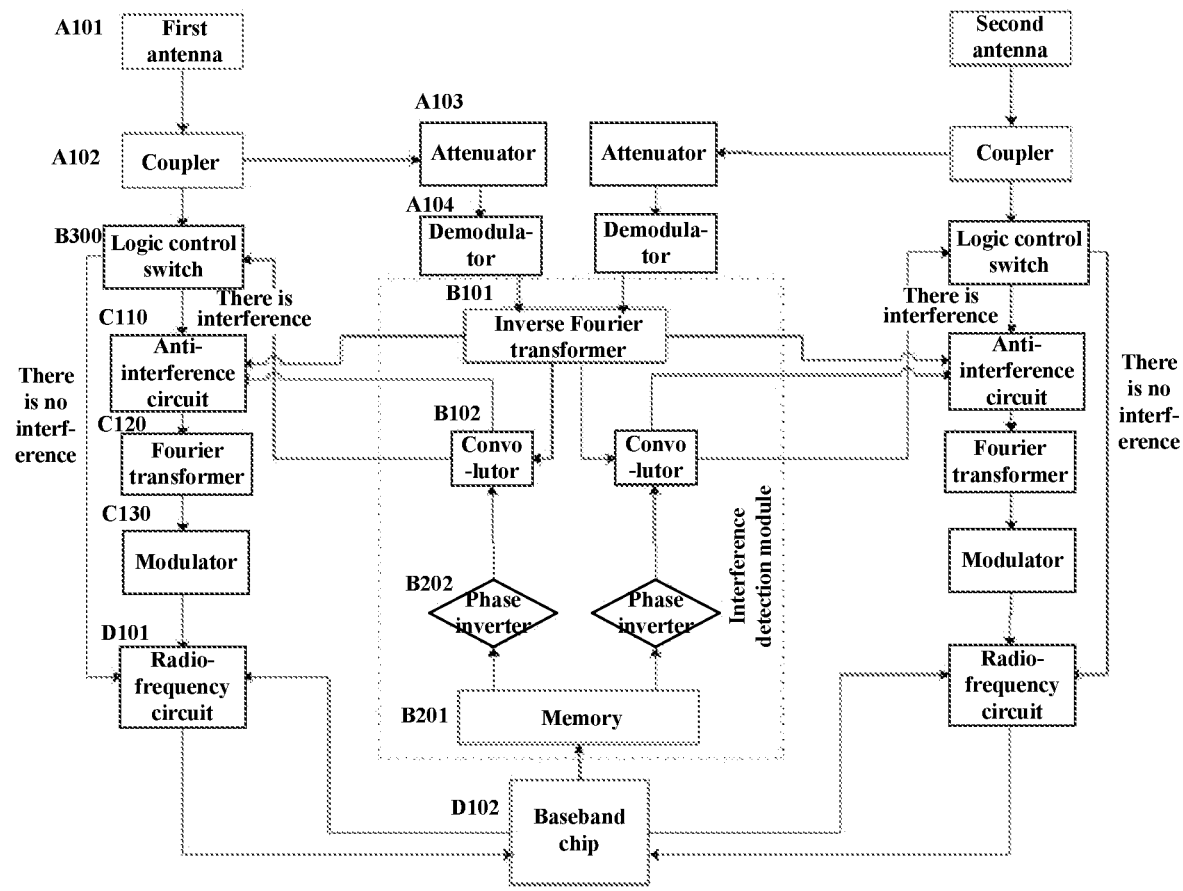
FIG. 7 is a schematic diagram of a detailed framework of a wireless communication anti-interference detection system according to some embodiments of the present disclosure.

In some embodiments, FIG. 7 is a schematic diagram of a detailed framework of a wireless communication anti-interference detection system according to some embodiments of the present disclosure. As shown in FIG. 7, the method includes the following operations.

A radio-frequency signal received by a first antenna A101 and/or second antenna A101 passes through a coupler A102, an attenuator A103 and a demodulator A104, and the acquired signal is subjected to inverse Fourier transform B101 to form into a superposition of sine waves having different frequencies. The superposition of sine waves and a specific baseband signal stored in a memory B201 and subjected to phase inversion of a phase inverter B202 are convolved by a convolutor B102. It is determined whether the value of the convolved signal is zero or whether the convolved signal is interfering, and the determination result controls a logic control switch B300, such as a switch SP2T. If the value is zero or the signal is not interfering, the coupler A102 is controlled to send the received radio-frequency signal directly to a radio-frequency circuit D101 for processing. If the value of the convolved signal is not zero or the signal is interfering, an interfering signal is filtered out by an anti-interference module C100, and finally, by a Fourier transform C120 and a modulator C130, a useful signal is modulated to the radio-frequency signal and the radio-frequency signal is processed by the radio-frequency circuit D101.

Some embodiments provide a communication anti-interference detection method. An exemplary embodiment describing an application scenario example of the method of the embodiments of the present disclosure is provided as follows, and this exemplary embodiment is used for further illustrating the embodiments of the present disclosure, and does not limit the method of the embodiments of the present disclosure. For example, a full-band bandwidth of the Band 41 is 196 MHz, and is divided according to the current requirements of an operator (Sub6G 100 MHz, LTE 60 MHz). In the example, the intermediate protection bandwidth between Sub6G N41 and LTE Band 41 is only 36 MHz. During the transmission based on the Sub6G, the sideband noise of the Sub6G transmission may fall into the receiving band of the LTE. Likewise, during the transmission based on the LTE, the sideband noise of the LTE transmission may also fall into the receiving band of the Sub6G.

As shown in FIGS. 6 and 7, 4G and 5G communications work at the same time. When N41 works on a first antenna A101, and B41 works on a second antenna, after two signals enter a switch, the two signals respectively pass through an attenuator A103 and a demodulator A104. A signal acquired by demodulating the radio-frequency signal is subjected to inverse Fourier transform to form a superposition of sine waves having different frequencies. The superposition of sine waves is convolved with a specific signal stored in a memory and subjected to phase inversion, so as to acquire a convolved interfering signal. A comparator determines whether the convolved interfering signal is zero or whether the convolved interfering signal is interfering. If the value is not zero or the convolved interfering signal is interfering (there is radio-frequency interference), a switch SP2T is controlled to send the signal to an additional anti-interference circuit C110, the received signal of N41 and the interfering signal acquired by the deconvolutor are inversely superposed and then filtered out, and a useful signal is modulated to the radio-frequency signal.

When communications of multiple systems work at the same time, interference may exist between the two frequency bands. When one of the systems works on a first antenna and the other works on a second antenna, after two signals enter a coupler, the two signals respectively pass through an attenuator and a demodulator, a signal acquired by demodulating the radio-frequency signal is subjected to inverse Fourier transform to form a superposition of sine waves having different frequencies, and then the superposition of sine waves is convolved with a specific signal stored in a memory and subjected to phase inversion to remove a useful sine wave signal, so as to acquire a convolved interfering signal. It is determined whether the convolved interfering signal is interfering. The Fourier transform formula is as follows:

$$\hat{f}(u) = \frac{1}{2\pi} \int_{-\infty}^{\infty} f(t) e^{-iut} dt$$

This formula is referred to as the Fourier transform of $f$, and is denoted as convolution (u). In some books, the factor preceding the integral is replaced. Assuming that the function $f \in (-\infty, \infty)$, the integral in the formula above can be calculated.

If the convolved interfering signal is interfering, the switch SP2T is controlled to turn on an anti-interference circuit, the convolved interfering signal passes through a deconvolutor and then is subtracted from a signal subjected to Fourier transform, so as to filter out the interfering signal, and finally a useful signal is modulated to a radio-frequency signal. If the convolved interfering signal is not interfering, the switch SP2T is controlled to send the radio-frequency signal directly to the radio-frequency circuit.

In some embodiments, the interference detection module includes an attenuator, a demodulator, an inverse Fourier transform module, a convolutor, and a memory.

In some embodiments, the inverse Fourier transform module needs to transform the demodulated radio-frequency signal into a superposition of sine waves having different frequencies.

In some embodiments, the type of the antenna circuit includes 2G antenna, 3G antenna, 4G antenna, 5G antenna, and/or 6G antenna.

In some embodiments, the anti-interference circuit includes a deconvolutor and a subtracter.

Some embodiments provide a communication anti-interference detection method. An exemplary embodiment describing an application scenario example of the method of the embodiments of the present disclosure is provided as follows, and this exemplary embodiment is used for further illustrating the embodiments of the present disclosure, and does not limit the method of the embodiments of the present disclosure. For example, the transmission frequency band of Band 7 is 2500 MHz-2570 MHz, while the frequency band of WIFI 2.4G is 2400 MHz-2483 MHz. When the two frequency bands work at the same time, the protection bandwidth between the two frequency bands is 17 MHz. During the transmission based on Band 7, the sideband noise of the Band 7 transmission may fall into the receiving band of the WIFI 2.4G. Likewise, during the transmission based on WiFi 2.4G, the sideband noise of the WIFI 2.4G transmission may also fall into the receiving band of the Band 7.

As shown in FIGS. 6 and 7, LTE and WIFI communications work at the same time. When the LTE works on a first antenna, and the WIFI works on a second antenna, after two signals enter a switch, the two signals respectively pass through an attenuator and a demodulator. A signal acquired by demodulating the radio-frequency signal is subjected to inverse Fourier transform to form a superposition of sine waves having different frequencies.

Herein, C is the direct-current component mentioned above, and an and bn are amplitudes of sinusoids of different frequencies. The sine waves are convolved with a specific signal stored in a memory and subjected to phase inversion, so as to acquire a convolved interfering signal. A comparator determines whether the convolved interfering signal is zero. If the value is not zero, the convolved interfering signal is interfering (i.e., there is radio-frequency interference), a switch SP2T is controlled to send the signal to an additional anti-interference circuit. The received signal of LTE Band 7 and the interfering signal acquired by the deconvolutor are inversely superposed and then filtered out, and a useful signal is modulated to the radio-frequency signal.

The foregoing descriptions are merely embodiments of the present disclosure applied to a wireless terminal access product such as a 5G mobile phone. All those modifications, equivalents and improvements falling within the principle of the present disclosure and made by combinations of frequency bands of different systems and transformation of a connection manner are intended to be encompassed in the scope of protection of the present disclosure.

The exemplary embodiments of the present disclosure described above are intended to illustrate but not limit the present invention. Any modification, equivalent replacement and improvement made within the principle of the present disclosure shall be encompassed in the scope defined by claims of the present application.

What is claimed is:

1. A signal interference detection method, comprising:
   demodulating an input radio-frequency signal to acquire a demodulated signal; and
   convolving a first signal and a second signal to acquire a detection signal, so as to detect whether there is an interfering signal in the input radio-frequency signal, wherein the first signal is a signal acquired by performing inverse Fourier transform on the demodulated signal, and the second signal is a signal acquired by performing phase inversion on a preset baseband signal.

2. The signal interference detection method according to claim 1, wherein the input radio-frequency signal comprises a first input radio-frequency signal and/or a second input radio-frequency signal, and the first input radio-frequency signal and the second input radio-frequency signal are based on different systems.

3. The signal interference detection method according to claim 1, wherein demodulating the input radio-frequency signal comprises:
   performing attenuation processing on the input radio-frequency signal, and then demodulating the attenuated radio-frequency signal to acquire the demodulated signal.

4. The signal interference detection method according to claim 1, wherein detecting whether there is an interfering signal in the input radio-frequency signal comprises:
   performing the inverse Fourier transform on the demodulated signal to acquire the first signal, wherein a manner for performing the inverse Fourier transform on the demodulated signal comprises performing the inverse Fourier transform on the demodulated signal to generate a superposition of sine waves having different frequencies;
   performing the phase inversion on the preset baseband signal to acquire the second signal;
   convolving the first signal and the second signal to remove a useful sine wave signal, so as to acquire the detection signal;
   determining whether the detection signal is interfering;
   in cases where the detection signal is interfering, performing anti-interference processing on the interfering detection signal; and
   in cases where the detection signal is not interfering, the input radio-frequency signal entering, via a non-interfering channel, the radio-frequency circuit for processing.

5. The signal interference detection method according to claim 4, wherein determining whether the detection signal is interfering comprises:
   determining whether a value of the detection signal is equal to zero;
   in cases where the value of the detection signal is equal to zero, determining that the detection signal is not interfering; and
   in cases where the value of the detection signal is not equal to zero, determining that the detection signal is interfering.

6. The signal interference detection method according to claim 1, further comprising:
   in cases where there is the interfering signal in the radio-frequency signal, processing the interfering detection signal and the first signal to acquire a third signal; and
   modulating the third signal to acquire an output radio-frequency signal.

7. The signal interference detection method according to claim 6, wherein acquiring the third signal further comprises:
   after deconvolving the interfering detection signal, performing subtraction or inverse superposition on the deconvolved interfering detection signal and the first signal, and filtering out the interfering signal to acquire the third signal.

8. A non-transitory computer-readable storage medium storing a program for signal interference detection thereon, wherein the program for signal interference detection, when executed by a processor, implements steps of the signal interference detection method according to claim 1.

9. A communication anti-interference detection device, comprising:
   a demodulation module, an interference detection module, an anti-interference module and a radio-frequency circuit processing module;
   wherein
   the demodulation module is configured to demodulate an input radio-frequency signal to acquire a demodulated signal-;
   the interference detection module is configured to convolve a first signal and a second signal to acquire a detection signal, so as to detect whether there is an interfering signal in the input radio-frequency signal, wherein the first signal is a signal acquired by performing inverse Fourier transform on the demodulated signal, and the second signal is a signal acquired by performing phase inversion on a preset baseband signal; and in cases where the detection signal is interfering, the anti-interference module is configured to process the interfering detection signal and the first signal to acquire a third signal, and the third signal is modulated to acquire an output radio-frequency signal, and is processed by the radio-frequency circuit processing module.

10. The communication anti-interference detection device according to claim 9, wherein the demodulation module comprises:
    a first antenna and/or a second antenna, an attenuator and a demodulator;
    the first antenna and/or the second antenna are/is configured to receive the input radio-frequency signal;

the attenuator is configured to perform attenuation processing on the input radio-frequency signal;

the demodulator is configured to demodulate the signal.

11. The communication anti-interference detection device according to claim 10, wherein the attenuator and demodulator through which the input radio-frequency signal received by the first antenna passes, and the attenuator and demodulator through which the input radio-frequency signal received by the second antenna passes are the same set of attenuator and demodulator, or are two or more sets of attenuators and demodulators.

12. The communication anti-interference detection device according to claim 9, wherein the interference detection module comprises:

an interference detection circuit, the interference detection circuit comprising an inverse Fourier transformer, a memory, a phase inverter and a convolutor;

the inverse Fourier transformer is configured to process the demodulated signal to acquire the first signal;

the memory is configured to store the preset baseband signal;

the phase inverter is configured to invert the phase of the preset baseband signal to acquire the second signal; and the convolutor is configured to convolve the first signal and the second signal to remove a useful sine wave signal, so as to acquire the detection signal.

13. The communication anti-interference detection device according to claim 12, wherein the same set of inverse Fourier transformer, memory, phase inverter, convolutor and logical control switch is shared by signals of different systems, or two or more sets of inverse Fourier transformers, memories, phase inverters, convolutors and logical control switches are respectively used for signals of different systems.

14. The communication anti-interference detection device according to claim 9, wherein the anti-interference module comprises:

an anti-interference circuit, a Fourier transformer and a demodulator;

wherein the anti-interference circuit comprises a deconvolutor and a subtracter;

the deconvolutor is configured to process the detection signal which is interfering;

the subtracter is configured to process the deconvolved signal and the first signal and filter out an interfering signal, so as to acquire the third signal;

the Fourier transformer and the demodulator are configured to process the third signal.

15. The communication anti-interference detection device according to claim 14, wherein the same set of convolutor, subtracter and Fourier transformer is shared by signals of different systems, or two or more sets of convolutors, subtracters and Fourier transformers are respectively used for signals of different systems.

16. The communication anti-interference detection device according to claim 9, wherein the radio-frequency circuit processing module comprises:

a radio-frequency circuit and a radio-frequency chip;

wherein the radio-frequency circuit is configured to process the output radio-frequency signal or a non-interfered input radio-frequency signal.

17. An electronic device, comprising a memory and a processor, wherein the memory is configured to store a computer program, and the processor is configured to run the computer program to:

demodulate an input radio-frequency signal to acquire a demodulated signal; and convolve a first signal and a second signal to acquire a detection signal, so as to detect whether there is an interfering signal in the input radio-frequency signal, wherein the first signal is a signal acquired by performing inverse Fourier transform on the demodulated signal, and the second signal is a signal acquired by performing phase inversion on a preset baseband signal.

18. The electronic device according to claim 17, wherein the input radio-frequency signal comprises a first input radio-frequency signal and/or a second input radio-frequency signal, and the first input radio-frequency signal and the second input radio-frequency signal are based on different systems.

19. The electronic device according to claim 17, wherein the processor is configured to run the computer program to:

perform attenuation processing on the input radio-frequency signal, and then demodulate the attenuated radio-frequency signal to acquire the demodulated signal.

20. The electronic device according to claim 17, wherein the processor is configured to run the computer program to:

perform the inverse Fourier transform on the demodulated signal to acquire the first signal, wherein a manner for performing the inverse Fourier transform on the demodulated signal comprises performing the inverse Fourier transform on the demodulated signal to generate a superposition of sine waves having different frequencies;

perform the phase inversion on the preset baseband signal to acquire the second signal;

convolve the first signal and the second signal to remove a useful sine wave signal, so as to acquire the detection signal;

determine whether the detection signal is interfering;

in cases where the detection signal is interfering, perform anti-interference processing on the interfering detection signal; and in cases where the detection signal is not interfering, make the input radio-frequency signal enter, via a non-interfering channel, the radio-frequency circuit for processing.

* * * * *